United States Patent
Turnbull et al.

(10) Patent No.: US 11,750,675 B2
(45) Date of Patent: Sep. 5, 2023

(54) LOW LATENCY MEDIA STREAMING

(71) Applicant: BRITISH TELECOMMUNICATIONS PUBLIC LIMITED COMPANY, London (GB)

(72) Inventors: Rory Turnbull, London (GB); Jonathan Rennison, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 693 days.

(21) Appl. No.: 15/740,525

(22) PCT Filed: Jun. 23, 2016

(86) PCT No.: PCT/EP2016/064617
§ 371 (c)(1),
(2) Date: Dec. 28, 2017

(87) PCT Pub. No.: WO2017/001289
PCT Pub. Date: Jan. 5, 2017

(65) Prior Publication Data
US 2018/0191803 A1    Jul. 5, 2018

(30) Foreign Application Priority Data
Jun. 30, 2015  (EP) .................................... 15275165

(51) Int. Cl.
*H04L 65/65*  (2022.01)
*H04N 21/472*  (2011.01)
(Continued)

(52) U.S. Cl.
CPC ............ *H04L 65/65* (2022.05); *H04L 65/612* (2022.05); *H04N 21/2187* (2013.01);
(Continued)

(58) Field of Classification Search
CPC ...................................................... H04L 65/608
See application file for complete search history.

(56) References Cited

U.S. PATENT DOCUMENTS

| 2014/0143440 A1* | 5/2014 | Ramamurthy ... H04N 21/23439 709/231 |
| 2014/0189066 A1* | 7/2014 | Gholmieh ............... H04L 67/02 709/219 |

(Continued)

FOREIGN PATENT DOCUMENTS

WO   WO 2014/120377   8/2014

OTHER PUBLICATIONS

International Search Report for PCT/EP2016/064617, dated Sep. 8, 2016, 3 pages.
(Continued)

*Primary Examiner* — Viet D Vu
(74) *Attorney, Agent, or Firm* — Nixon & Vanderhye P.C.

(57) ABSTRACT

Examples of the present invention provide a method of reducing the latency in streaming live media by a client from a server. The client uses manifest information to determine the "live edge" of the live media stream, where the live edge is represented by the segment from the media stream corresponding to the current time. The client then uses this to identify the next segment, which is the segment in time that will next become available. The client then starts making repeated polling requests for that next segment until the segment becomes available. As a result, the newest possible segment is obtained by the client as soon as it becomes available, and latency is reduced. Further, when adopted by all clients, the latency variation between clients is also reduced.

12 Claims, 6 Drawing Sheets

(51) Int. Cl.
*H04N 21/2187* (2011.01)
*H04L 65/612* (2022.01)
*H04N 21/845* (2011.01)
*H04N 21/262* (2011.01)
*H04N 21/6587* (2011.01)

(52) U.S. Cl.
CPC . *H04N 21/26258* (2013.01); *H04N 21/26283* (2013.01); *H04N 21/472* (2013.01); *H04N 21/6587* (2013.01); *H04N 21/8456* (2013.01)

(56) References Cited

U.S. PATENT DOCUMENTS

| | | | | |
|---|---|---|---|---|
| 2014/0195651 | A1* | 7/2014 | Stockhammer | H04N 21/23439 709/219 |
| 2014/0372624 | A1* | 12/2014 | Wang | H04L 69/18 709/231 |
| 2015/0106847 | A1* | 4/2015 | Han | H04N 21/2668 725/39 |
| 2015/0172733 | A1* | 6/2015 | Tokumo | H04N 21/458 725/98 |
| 2015/0341678 | A1* | 11/2015 | Koba | H04N 21/4147 725/100 |
| 2017/0070781 | A1* | 3/2017 | Bar Yanai | H04L 43/0894 |

OTHER PUBLICATIONS

Thomas Stockhammer et al., "Low-Latency Live Streaming: Extensions for accurate timing support", 103. MPEG Meeting; Jan. 21, 2013-Jan. 25, 2013; Geneva; (Motion Picture Expert Group or ISO/IEC JTC1/SC29/WG11), No. m28196, Jan. 20, 2013 (Jan. 20, 2013), XP030056743 (7 pages).

Examination report dated Nov. 6, 2020 issued for European Patent Application No. 16 733 048.9 (6 pages).

* cited by examiner

```
1   <MPD xmlns="urn:mpeg:dash:schema:mpd:2011" minBufferTime="PT12.000000S" type="dynamic" availabilityStartTime="2015-06-
2   22T10:55:00Z" timeShiftBufferDepth="PT0H5M0.00S" minimumUpdatePeriod="PT0H30M0.00S"
3   profiles="urn:mpeg:dash:profile:isoff-live:2011">
4     <ProgramInformation>
5       <Title>BBC ONE HD</Title>
6     </ProgramInformation>
7     <Period start="PT0H0M0.00S">
8       <AdaptationSet segmentAlignment="true" maxWidth="1280" maxHeight="720" maxFrameRate="25" par="16:9">
9         <SegmentTemplate timescale="12800" media="dash-seg-0-1434970476-$RepresentationID$-$Number$.m4s"
10          startNumber="1" duration="102400" initialization="dash-seg-0-1434970476-$RepresentationID$-init.mp4"/>
11        <Representation id="1" mimeType="video/mp4" codecs="avc1.64001f" width="1280" height="720"
12          frameRate="25" sar="1:1" startWithSAP="1" bandwidth="1570343"></Representation>
13      </AdaptationSet>
14      <AdaptationSet segmentAlignment="true" lang="eng">
15        <SegmentTemplate timescale="48000" media="dash-seg-0-1434970476-$RepresentationID$-$Number$.m4s"
16          startNumber="1" duration="384000" initialization="dash-seg-0-1434970476-$RepresentationID$-init.mp4"/>
17        <Representation id="2" mimeType="audio/mp4" codecs="mp4a.40.2" audioSamplingRate="48000"
18          startWithSAP="1" bandwidth="143383">
19          <AudioChannelConfiguration schemeIdUri="urn:mpeg:dash:23003:3:audio_channel_configuration:2011"
20            value="2"/>
21        </Representation>
22      </AdaptationSet>
23    </Period>
24  </MPD>
```

Figure 6

LOW LATENCY MEDIA STREAMING

This application is the U.S. national phase of International Application No. PCT/EP2016/064617 filed 23 Jun. 2016, which designated the U.S. and claims priority to EP Patent Application No. 15275165.7 filed 30 Jun. 2015, the entire contents of each of which are hereby incorporated by reference.

FIELD OF THE INVENTION

This invention relates to the field of media delivery over a network, in particular to a method of delivering media to a client with minimal latency.

BACKGROUND TO THE INVENTION

Streaming media, such as video and audio, over IP networks is commonplace today. Two standards in particular have risen in popularity: MPEG-DASH (Dynamic Adaptive Streaming over HTTP) as set out in ISO/IEC 23009-1 and Apple's HLS (HTTP Live Streaming). Both these standards support adaptive bit rate streaming, where media is encoded at different bit rates, and a client can decide which bit rates to use.

In MPEG-DASH, a continuous media stream is typically segmented in time and stored as a sequence of discrete files (segments) at a media server. A client can make requests to the server for the segments using HTTP. Streams may be live, or on-demand. Each segment contains a duration of media, for example 10 seconds. Typically audio and video are in separate sets of files.

A stream is described by an XML manifest file which contains metadata, URLs and timing information associated with the stream and its segments. A client can use the manifest to determine which segments to request and the URL for finding them. The client can then make HTTP requests for the required segments using the corresponding URL.

If the stream is available on-demand, then the encoded media and all the segments are generated and made available in advance. If a stream is live, then the segments themselves are made available continuously. Whether the stream is live or on-demand, the manifest is created in advance under MPEG-DASH. The manifest has enough information in it for a client determine when a segment will be available, which is particularly important for a live stream, as well as where to locate the segment. Thus, the client can determine which segments are available at any given time once the manifest is retrieved, with segments for the current time representing the "live edge".

The problem faced when requesting live streams in this manner is that there can be a significant variation in delay between requests for segments from clients, and the subsequent playback of the media stream. This is due largely to the segment duration being large, and requests being made for that segment at any time during its duration. For example, if the duration of a segment is 10 seconds, then one client might try and stream from the live edge with a segment that has just been made available, but another client might try and make a request slightly later but still get the same segment, just before the next segment is about to be available. In this situation, the latency variation between the two requests would be close to 10 seconds (or the segment duration). Clients in the same locality would not be synchronised which for live services, and in particular sports coverage, would be undesirable.

Further variations in latency can occur as a result of clock variations between clients and the content server not being in sync, as the clocks are used in determining which segments are at the live edge.

US patent application US2014/0189066 describes a method and system that enable a receiver device to account for delays in the availability of data segments. In one example, a server operates with elastic response times for serving segments in response to segment requests. In this manner, the server can account for unpredictable delay in segment availability.

US patent application US2014/0195651 describes techniques related to signalling time information for live streaming e.g. using MPEG-DASH. A source device advertises times, in wall-clock time, at which segments of media content will be available. The source device ensures that a segment is fully formed by the advertised wall clock time. Furthermore, the source device may advertise a synchronization method by which client devices can synchronize their local clocks with the wall clock times.

SUMMARY OF THE INVENTION

It is the aim of embodiments of the present invention to provide an improved method of managing live media streams.

According to one aspect of the present invention, there is provided a method of streaming a media sequence by a client from a server, wherein said media sequence comprises a sequence of encoded segments and said media sequence is progressively made available at a server, said method comprising:
  determining the most recent encoded segment made available at the server;
  identifying the next encoded segment to be made available at the server as the encoded segment in the sequence after the most recent encoded segment; and
  repeatedly making requests to the media server for the next encoded segment until an acknowledgement is received that the next encoded segment is available.

After an acknowledgement is received that the next segment is available, the client may start streaming of the media sequence from the next encoded segment.

The request may be made at predetermined intervals. Further, the requests may be repeated until a predetermined timeout duration has elapsed.

The media sequence is preferably a live media sequence.

A manifest may be associated with the media sequence, and the most recent segment may be determined using timing information in the manifest.

According to a further aspect of the present invention, there is provided a client device for streaming a media sequence from a server, wherein said media sequence comprises a sequence of encoded segments and said media sequence is progressively made available at a server, said client device comprising a control module adapted to:
  determine the most recent encoded segment made available at the server;
  identify the next encoded segment to be made available at the server as the encoded segment in the sequence after the most recent encoded segment; and
  repeatedly making requests to the media server for the next encoded segment until an acknowledgement is received that the next encoded segment is available.

Advantageously, the total latency between the media being made available and the client starting streaming is reduced, as is the variation in this latency between different client requests. This is effectively achieved by the client commencing retrieval and playback of a live media stream as soon as the next segment is published at the server, instead of starting with the most recently published segment currently available at the server.

The latency variation, associated with the difference between the time that a media segment is made available at the server and the time that it is requested by the client, is reduced. This latency variation would otherwise range from between 0 and the length of a segment (e.g. 10 sec). Examples of this invention reduces this latency variation to around 100 ms on average in a practical scalable implementation, although lower delay variations are possible. There is an additional benefit of reducing the overall end to end delay by on average half the segment length (e.g. 5 sec).

Examples of the invention mean there needs to be less reliance on accurate clock synchronisation to determine the most recent segment or "live edge".

BRIEF DESCRIPTION OF THE DRAWINGS

For a better understanding of the present invention reference will now be made by way of example only to the accompanying drawings, in which:

FIG. 6 is an example of a manifest file.

DESCRIPTION OF PREFERRED EMBODIMENTS

The present invention is described herein with reference to particular examples. The invention is not, however, limited to such examples.

Examples of the present invention provide a method of reducing the latency in streaming live media by a client from a server. The client uses manifest information to determine the "live edge" of the live media stream, where the live edge is represented by the segment from the media stream corresponding to the current time. The client then uses this to identify the next segment, which is the segment in time that will next become available. The client then starts making repeated polling requests for that next segment until the segment becomes available. As a result, the newest possible segment is obtained by the client as soon as it becomes available, and latency is reduced. Further, when adopted by all clients, the latency variation between clients is also reduced.

Figure 1:
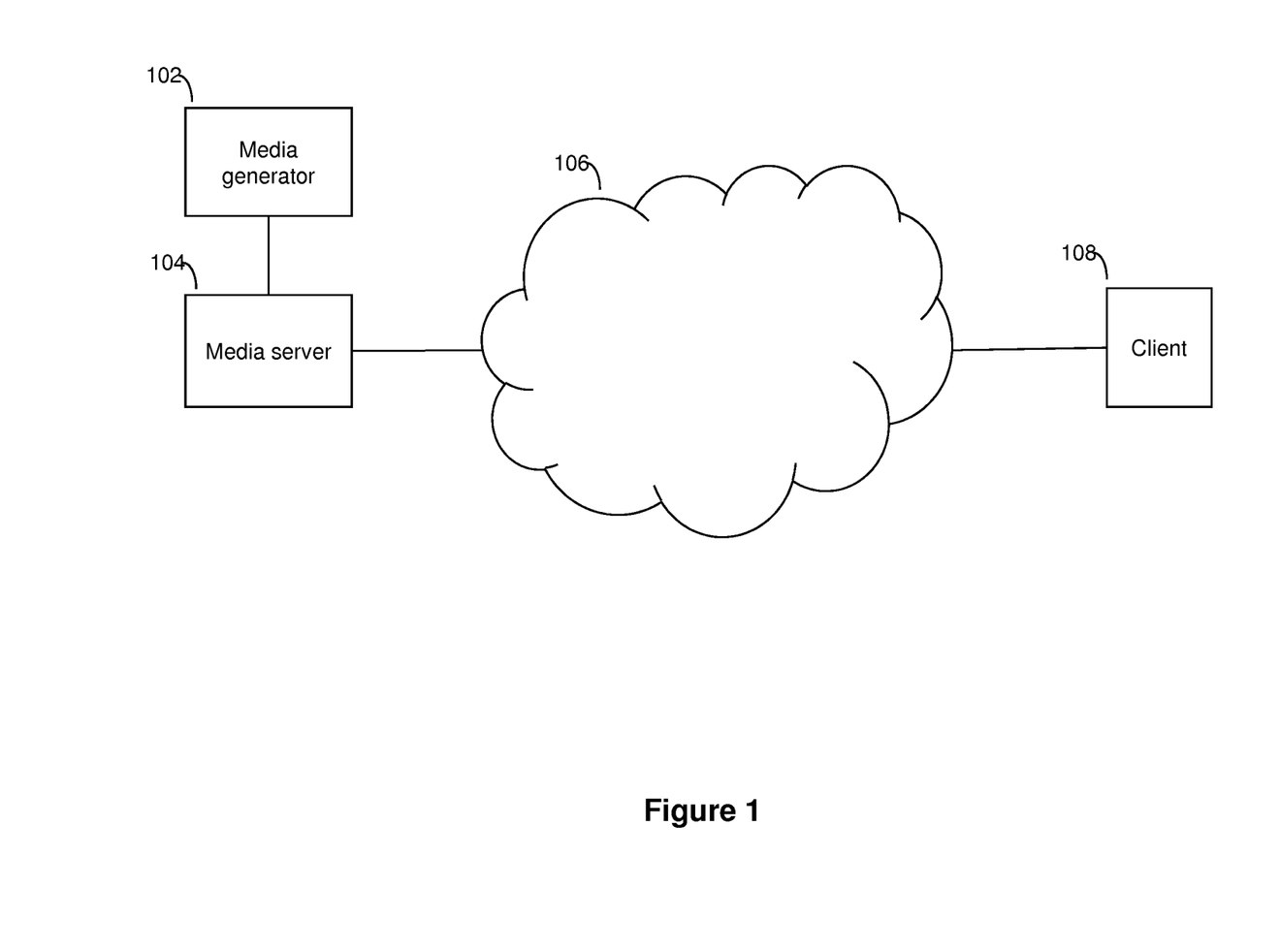
FIG. 1 is a network diagram in an example of the present invention.

FIG. 1 shows a system 100 comprising a media generator 102 communicating with a media server 104. The media generator 102 takes an uncompressed live media stream, such as from a live TV broadcast made up of video and audio data, and encodes and packages the media stream into segments. The media stream maybe encoded using suitable codecs, such as ITU-T H.264 for the video data, and the encoded media stream divided and packaged sequentially into temporal segments, in accordance with the MPEG-DASH standard in this example. The segments can be any duration, but between 2 to 10 seconds is typical.

Under MPEG-DASH, the sequence of segments that represent the media stream is structured in a hierarchical manner using representations and adaptation sets. A representation is an encoding of a single component of the media stream, such as video, audio or subtitles, arranged as a sequence of segments. An adaptation set is a list of equivalent representations which the client can choose between. This is particularly useful in adaptive bit-rate arrangements, where each adaptation set may contain more than one representation of the same content. For example, the media sequence may contain one video adaptation set, which contains two video representations with video encoded at different bit rates. In non-adaptive streams, an adaptation set would contain exactly one representation, so they can be considered equivalent. Whilst the present invention is equally applicable to an adaptive bit rate arrangement, for simplicity, a non-adaptive arrangement is described in this example, and thus there is a single encoded video representation and a single encoded audio representation, each made up of respective sequence of video and audio segments.

Figure 2:
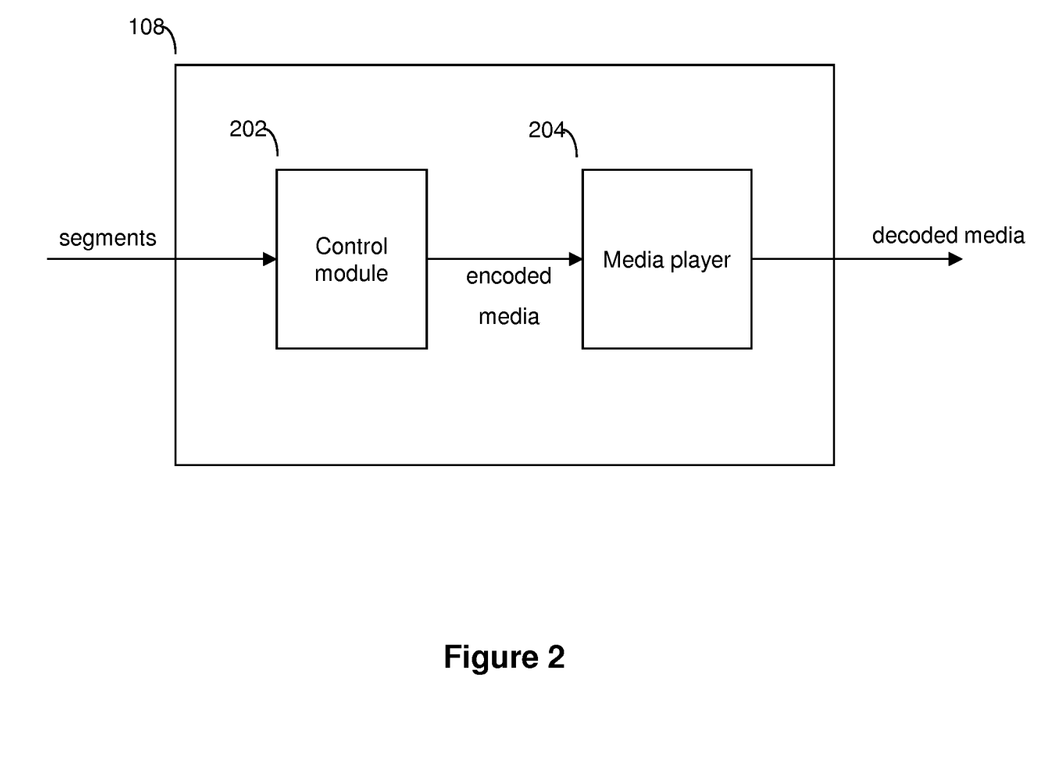
FIG. 2 is a block diagram of a client device in an example of the invention.

Once generated, the segments are passed from the media generator 102 to media server 104, where they are stored and made available for streaming by the client device 108. In this arrangement where the media stream is live, the segments associated with the media stream are not made available at the media server 104 all at once, but instead are made available progressively. An example of a live media stream is a live football match. However, a TV channel composed of a schedule of largely pre-recorded material (such as BBC 1 in the UK) can also be considered as a live media stream, as the media is only made available for consumption as the delivery schedule advances The media server 104 and client device 108 both operate according to the MPEG-DASH standard in this example, though the methods described below are equally applicable to other streaming standards such as HTTP Live Streaming (HLS). Examples of a client device include a PC, smartphone, and set-top box. The client device 108 is connected to the media server 104 over a network connection 106, which would typically include the Internet. As shown in FIG. 2, the client device 108 comprises a control module 202 and a media player 204. The control module 202 may be implemented in software, hardware, or a combination of the two. The control module 202 makes requests for segments from the media server 104, processes received segments into encoded media that can be handled by the media player 204 for decoding and playback.

The client device 108 utilises a manifest file to identify and locate the segments for the media stream. Under MPEG-DASH, the manifest file is an XML document called a Media Presentation Description (MPD). The manifest provides information about a media stream, the segments, location of where those segments are stored (using URLs), timing information and so on. The manifest is usually stored at the media server 104.

The client device 108 first retrieves the manifest from the media server 104. In this example where the stream is a live stream, segments are made available at the media server 104 progressively. The client device 108 uses the manifest to determine the URL identifying the location of each segment. In this example, the segments are stored at the media server 104, and thus the client device 108 makes HTTP requests to the media server using the determined URLs for the segments. The media server 104 returns the segments requested by the client device 108 over the network 106.

As described earlier, latency variation occurs when using the timing information in the manifest to directly identify the current segment of a live media stream, and streaming starts from that segment. Examples of the invention will now be described that help mitigate such a problem.

Figure 3:
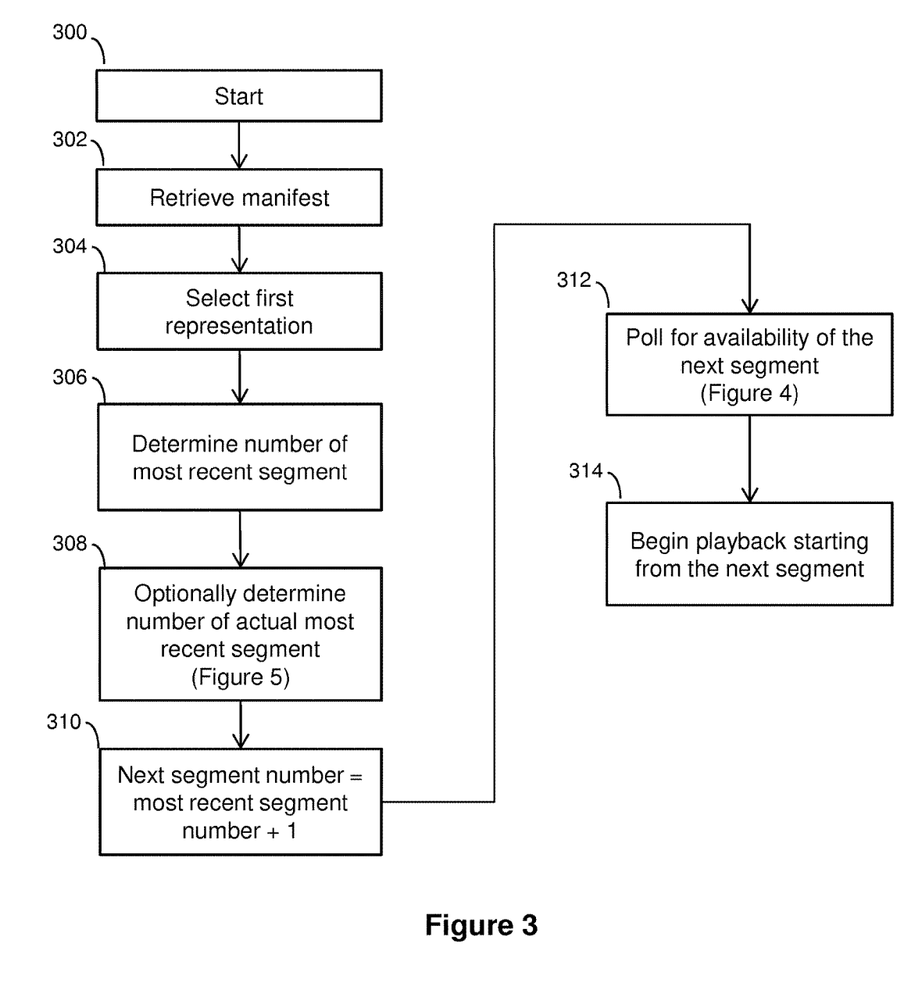
FIG. 3 is a flow chart summarising the main steps of an example of the invention.

The flow chart of FIG. 3 summarises an example of the invention.

Processing starts at step 300.

In step 302, the manifest (the DASH MPD) associated with a live media stream is retrieved by the client device 108 from the media server 104. FIG. 6 shows an example of a manifest file (line numbers have been added on the left hand side for ease of referencing elements in the manifest). Note, the manifest uses a template mechanism to describe the URLs for each segment, where specific identifiers are substituted for dynamic values assigned to segments to create a list of segments.

In step 304, the client device 102 selects one of the representations, for example the video representation in step 304.

In step 306, the number of the most recent segment, or current segment, according to the current clock time at the client device, that should be available is determined by the client device 108 using data from the manifest. This can be done in a number of ways, but one approach is now described. Note, the terms "most recent segment" and "current segment" are used interchangeably throughout the description.

Each representation in the manifest has a duration and a start number, and the sequence as a whole has a start time.

The current segment number for each representation can be calculated as:

current segment number=start number+time since start/duration where the time since start=current time−start time, and the current time is taken from the client device's clock.

Referring to the manifest in FIG. 6:
The start time is labelled availabilityStartTime in the <MPD> tag (see line 1).
The <SegmentTemplate> tag applies to each <Representation> in the <AdaptationSet> tag, such that:
  the segment start number is labelled startNumber (see line 10) in the <SegmentTemplate> tag
  the duration is labelled duration (see line 10) in the <SegmentTemplate> tag, and is in units of timescale (see line 9).
Once the current segment number is found, it can be used to determine the URL required for retrieving the current segment, by using the template labelled media (line 9) in the <SegmentTemplate> tag. $RepresentationID$ and $Number$ are substituted for the actual values for the particular segment.

Using values from the manifest of FIG. 6, if the current time is 16:51:48 UTC on 22 Jun. 2015, then the most recent video segment number, and URL, are calculated by the client device 108 as follows:

Time since start=16:51:48−10:55:00=21408 seconds

Segment duration=duration/timescale=102400/ 12800=8 seconds long

The first segment is number 1 (see line 10). Therefore, the current segment is determined as follows:

Current segment number=1+21408/8=2677

Therefore, the current, or most recent, segment number is 2677. And the associated URL of current segment would be dash-seg-0-1434970476-1-2677.m4s The client device 108 could at this stage use the URL to retrieve the current segment, and start playback starting from this segment.

However, examples of the present invention present several modifications to this approach to reduce latency variation.

In step 308, after the most recent segment has been identified, the client device 108 can optionally perform an additional step to confirm the most recent segment number. This can be useful for correcting timing variations between the server and client clocks. Step 308 is illustrated in the flow chart of FIG. 5, and will be discussed later. For now, it is assumed that the most recent segment determined in step 306 is sufficient, so step 308 is not performed for now and processing passes to step 310.

Figure 5:
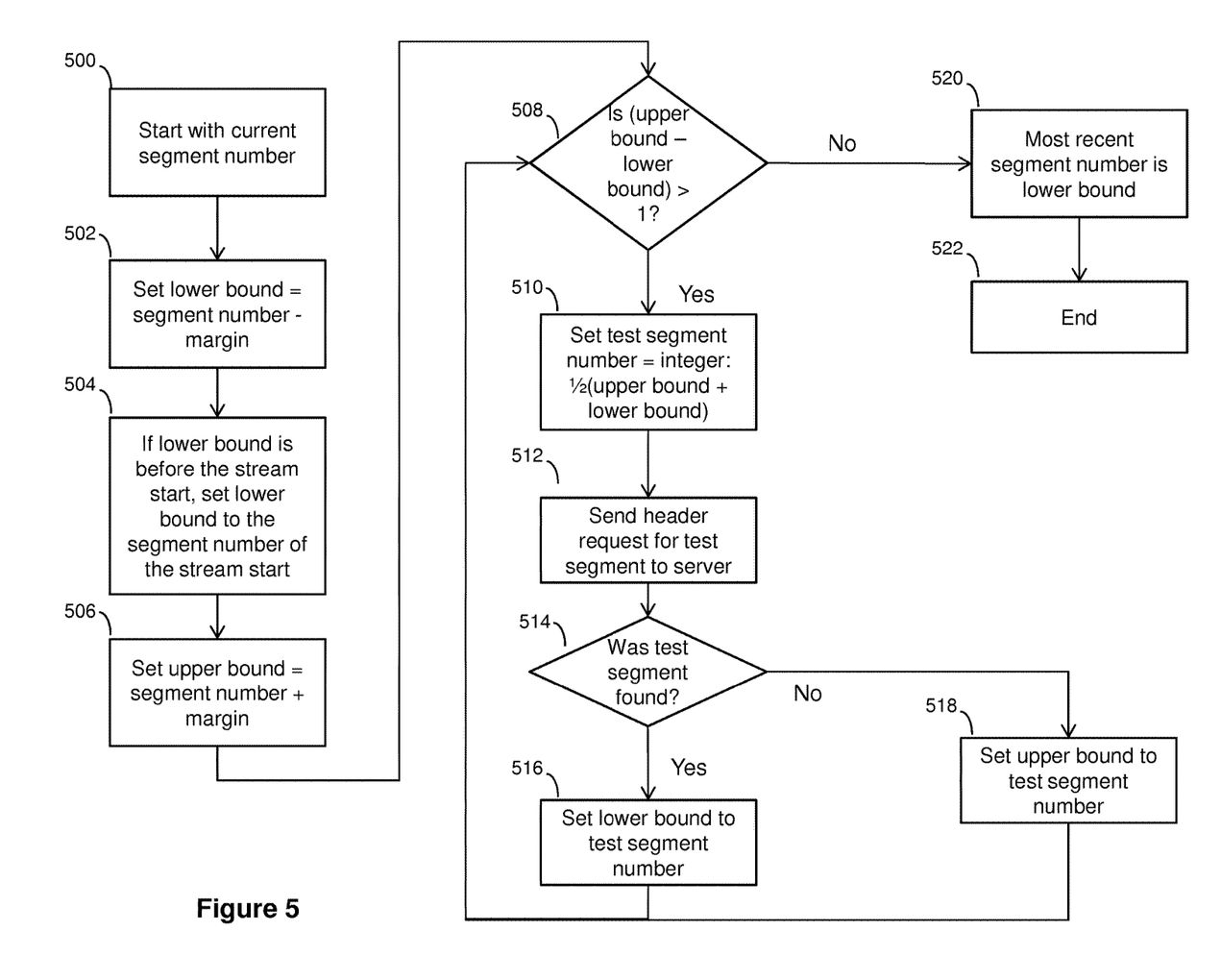
FIG. 5 is a flow chart summarising a method for more accurately determining the live edge in an example of the present invention.

In step 310, the client device 108 sets the next segment number to be the current segment number identified in step 308 plus 1 (or the current segment number from FIG. 5 step 520 plus 1, if the optional method of FIG. 5 is used). Using the values from the example above, if the current segment number is 2677, then the next segment number is 2678. This new segment number thus corresponds to the segment number of the next segment that should be made available at the media server 104.

In step 312, the client device 108 starts to poll for the availability of this (next) segment using header request polling. The method polls the media server 104 for a segment until the media server 104 response indicates that the segment is available, at which point streaming and playback can start from that segment. The method includes a timeout mechanism to prevent it from looping indefinitely in the event that a failure causes the segment to not become available within the expected time period. The polling method is performed by the client device 108 and summarised in FIG. 4, and will now be described in more detail.

First a suitable timeout duration is chosen, which in this example is 1.5*the segment duration. This is because the time interval before the segment becomes available can be expected to vary between 0 and the segment length in non-failure conditions, as the previous segment is already available as determined by the method in FIG. 3. An additional 0.5*the segment duration is added as an error margin.

Figure 4:
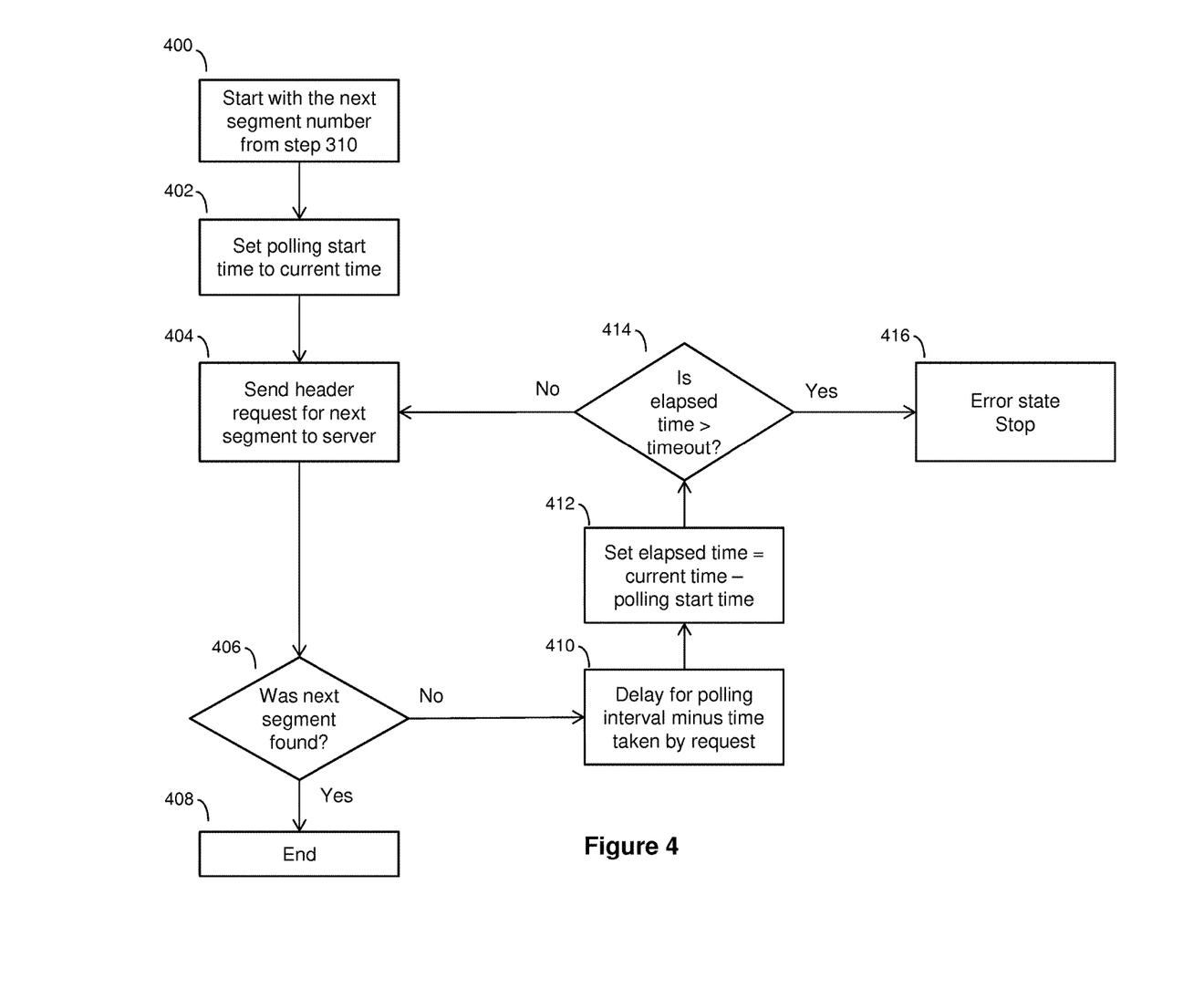
FIG. 4 is a flow chart summarising a polling technique in an example of the present invention.

A polling interval can also be used, which should be chosen as a compromise between increasing latency reduction and latency variation reduction, and increased server load and bandwidth wasted, as the interval decreases. The number of header requests required can be expected to vary between approximately 1 and the segment length divided by the polling interval. A suitable example value for the polling interval could be 200 ms.

Then in step 400, the method starts with the next segment number determined in step 310, i.e. segment number 2678.

In step 402, a polling start time is set to the current time from the client device 108 clock. This is used later as the basis for the timeout calculation.

In step 404, a header request is sent to the media server 104 for the segment using the segment number from step 400. The header request can be implemented using a HTTP HEAD request using the URL of the next segment e.g. dash-seg-0-1434970476-1-2678.m4s.

In step 406, if the next segment is available, the client device 108 will receive a 200 OK HTTP response status code from the media server 104 with polling finishing at step 408, and processing passes to step 314 of FIG. 3. However, if the test segment is not available, the client device 108 will receive a 404 Not Found HTTP response status code from the media server 104, and processing passes to step 410. The time taken for the media server 104 to respond is also recorded by the client device.

In step 410, the client device 108 delays for the polling interval minus the time taken for the media server 104 to respond. If the time taken to respond is greater than the polling interval, then there is no delay. The use of a delay is to prevent excessive numbers of requests, which use server and bandwidth resources.

After the delay, processing passes to step 412. In step 412, the elapsed time is set to current time—polling start time. Then in step 414 the elapsed time is tested against the timeout duration. If the elapsed time has exceeded the timeout duration, then processing stops with step 416, as the segment has not become available in the expected time period, which indicates an error/failure condition. The method is thus aborted to prevent it from cycling round indefinitely. In this event a client device may be configured to signal an error to the user or to request for an older segment in an attempt to maintain some degree of service. However, the fact that a segment has not been made available in the expected time period is indicative of a wider problem (e.g. service outage). If the timeout period has not elapsed, processing passes back to step 404 where polling is repeated.

Therefore, the method will continue with repeated polling until an acknowledgement is received from the media server that the segment is available at step 406, or if the timeout duration has been exceeded in step 414.

Once the next segment is found in step 406, processing will pass back to FIG. 3 at step 314.

At step 314, the client device 108 can start playback from the next segment, as per the MPEG-DASH standard, by sending an HTTP GET request for segment 2678 using the associated URL.

By using the method set out in FIG. 3, playback will begin within a time interval between 0 and the polling interval of a segment becoming available, instead of between 0 and the segment duration if this method is not used.

Furthermore, the average playback latency is reduced by ½(segment duration—polling interval), and the playback latency variation is reduced from a segment length to the polling interval.

There now follows a description of the optional method set out in FIG. 5. The method can be used by the client device 108 to find the most recently available segment in the region of a starting point+/−a margin using bisection. The margin is a duration, which in this example is measured in segments. The method assumes that the starting point is incorrect either positively or negatively by no more than the value of the margin. The method requires approximately $\log_2(\text{margin})$ additional requests. The value of the margin should be selected to be large enough to correct the maximum expected variation between the client device and server clocks.

The method starts at step 500, where the client device 108 starts with the current segment number determined from step 306.

In step 502, a variable "lower bound" is calculated as the most recent segment number minus the value of the margin. This is the inclusive lower limit of the bisection.

In step 504, if the lower bound is before the start of the stream, as determined from the manifest, it is adjusted to be the segment number of the start of the stream.

In step 506, a variable "upper bound" is calculated as the most recent segment number plus the value of the margin. This is the exclusive upper limit of the bisection.

In step 508, a test is made to determine if the upper bound−lower bound>1. If yes, then processing passes to step 510, as the interval between the bounds contains more than 1 segment. However, if no, then the interval contains only one possible value, so processing passes to step 520, where the most recent segment is set to the lower bound, and then processing ends at step 522 and passes back to step 310 of FIG. 3.

In step 510, a variable "test segment number" is calculated as the integer mid-point of the interval formed by the lower and upper bounds. This can be calculated as=½(upper bound+lower bound), and must be rounded to an integer.

In step 512, a header request is sent to the media server for the segment with the number of the test segment number. This header request can be in the form of a HTTP HEAD request, using the URL associated with the test segment number as per step 404 earlier.

The media server will respond either with a 200 OK HTTP response status code or a 404 Not Found HTTP response status code depending on whether the test segment is present or not respectively. Thus, in step 514, a test is made to determine whether the test segment was found based on the server response.

If the segment exists, then processing passes to step 516, and the lower bound is set to the test segment and processing passes back to step 508. The most recent segment number must be greater than or equal to the test segment number, as the test segment does exist.

If the segment does not exist, then the upper bound is set to the test segment number in step 518, and processing also passes back to step 508. The most recent segment number must be less than the tested segment number, as the test segment does not exist.

The test at step 508 is as described above, with the method repeating from step 510 if the result of the test in step 508 is yes. Otherwise if the result of the test in step 508 is no, i.e. the upper bound−lower bound is not>1, then the most recent segment number is set to the value of the lower bound in step 520, and processing returns to step 310.

Whilst the above methods of FIGS. 3, 4 and 5 have been described as being performed by the client device 108, in practice, it is specifically the control module 202 within the client device 108 that handles the processing.

Exemplary embodiments of the invention are realised, at least in part, by executable computer program code which may be embodied in application program data. When such computer program code is loaded into the memory of a processor in the control module 202, it provides a computer program code structure which is capable of performing at least part of the methods in accordance with the above described exemplary embodiments of the invention.

A person skilled in the art will appreciate that the computer program structure referred can correspond to the flow charts shown in FIGS. 3, 4 and 5, where each step of the flow chart can correspond to at least one line of computer program code and that such, in combination with the processor in the control module 202, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of streaming a media sequence by a client from a server, wherein said media sequence comprises a sequence of encoded segments and said media sequence is progressively made available at the server, said method comprising:

determining a most recent encoded segment made available at the server;
   identifying a next encoded segment to be made available at the server as the encoded segment in the sequence after the most recent encoded segment;
   repeatedly making requests to the server for the next encoded segment until an acknowledgement is received that the next encoded segment is available;
   receiving an acknowledgement that the next encoded segment is available; and
   starting streaming of the media sequence from the next encoded segment instead of from the most recent encoded segment.

2. A method according to claim 1, wherein the requests are made at predetermined intervals.

3. A method according to claim 1, wherein the requests are repeated until a predetermined timeout duration has elapsed.

4. A method according to claim 1, wherein the media sequence is a live media sequence.

5. A method according to claim 1, wherein the most recent segment is determined using timing information in a manifest associated with the media sequence.

6. A client device for streaming a media sequence from a server, wherein said media sequence comprises a sequence of encoded segments and said media sequence is progressively made available at a server, said client device comprising a processor and non-transitory storage memory storing executable computer program code for execution by the processor such that the client device is at least configured to:

determine a most recent encoded segment made available at the server;
   identify a next encoded segment to be made available at the server as the encoded segment in the sequence after the most recent encoded segment;
   repeatedly make requests to the server for the next encoded segment until an acknowledgement is received that the next encoded segment is available;
   receive an acknowledgement that the next encoded segment is available; and
   start a streaming of the media sequence from the next encoded segment instead of from the most recent encoded segment.

7. The client device according to claim 6, wherein the requests are made at predetermined intervals.

8. The client device according to claim 6, wherein the requests are repeated until a predetermined timeout duration has elapsed.

9. The client device according to claim 6, wherein the media sequence is a live media sequence.

10. The client device according to claim 6, wherein the most recent segment is determined using timing information in a manifest associated with the media sequence.

11. The client device according to claim 6, wherein a determination of the most recent encoded segment includes identifying the most recent encoded segment according to a current time at the client device.

12. The method according to claim 1, wherein determining the most recent encoded segment includes identifying the most recent encoded segment according to a current time at the client device.

* * * * *